United States Patent Office 3,359,248
Patented Dec. 19, 1967

3,359,248
ZINC OR MERCURY SALT CATALYTIC PROCESS
Stephen W. Osborn, Yardley, Theodore F. Wells III, Morrisville, and Ernest L. Kutch, Levittown, Pa., assignors to Thiokol Chemical Corporation, Bristol, Pa., a corporation of Delaware
No Drawing. Continuation of application Ser. No. 269,774, Apr. 1, 1963. This application Dec. 2, 1966, Ser. No. 598,877
26 Claims. (Cl. 260—79.7)

This application is a continuation of application S.N. 269,774, filed Apr. 1, 1963, now abandoned.

This invention relates to a novel process for the production of polyepisulfides of relatively high molecular weight. The polyepisulfides produced by the novel process of the present invention may be either homopolymers or interpolymers, depending upon whether one, or more than one, monomeric episulfide is used as a starting material. Particularly, the invention relates to the use of zinc and/or mercury salt catalysts in the polymerization process.

It is an object of the invention to provide a process for making polyepisulfides having high molecular weights. It is another object of the invention to provide novel catalysts adapted to be used in such a polymerization process.

It has now been unexpectedly found that readily available zinc and/or mercury salts, such as the peroxides, sulfides, chromites, adipates, oxalates, oxides, hydroxides and carbonates will effectively catalyze the polymerization of episulfides to form useful high molecular weight polymeric materials. These catalysts may be used singularly or in combination with one another. The catalysts of the present invention are preferably used in a particulate state. It has been found that, generally speaking, the finer the particle size the more reactive is the catalyst. The preferred particle size is of the order of less than one micron. The zinc salts are preferred because of the general toxicity of the mercury salts.

The present process is generally applicable to the polymerization of episulfide monomers. Typical monomeric episulfide polymerizable by this process are styrene sulfide, allylthioglycidyl ether, thioglycidyl acrylate, thioglycidyl methacrylate, 3,4-epoxy-1,2-butylene sulfide, vinylcyclohexene sulfide, butadiene monoepisulfide and alkylene sulfides such as ethylene sulfide, propylene sulfide, butylene sulfide (i.e., 1,2-butylene sulfide, 2,3-butylene sulfide) and cyclohexene sulfide. Mixtures of two or more of these monomeric episulfides may also be used as starting materials and interpolymerized. In general, the polymers, and interpolymers produced according to the present invention are insoluble in water and the polymers made entirely or principally from ethylene sulfide are substantially completely insoluble in solvents such as benzene, acetone, hexane and methylene chloride. That is, they are soluble to the extent of less than 1% by weight in the solvents.

The homopolymers of ethylene sulfide produced by this process are crystalline solids having high melting points. They are useful as high temperature molding materials, and when melted they can be formed into flexible films. Interpolymers of ethylene sulfide and propylene sulfide and/or butylene sulfide produced by the present process can be used to form valuable extrudable materials. When melted, the solid copolymers can also be formed into flexible films. Interpolymers of propylene sulfide and/or butylene sulfide and allylthioglycidyl ether, thioglycidyl acrylate, thioglycidyl methacrylate, 3,4-epoxy-1,2-butylene sulfide, vinylcyclohexene sulfide and/or butadiene monoepisulfide can be made from monomeric mixtures containing about 3% to 20% by weight of one or more of the latter seven monomers and such interpolymers can be cured by conventional vulcanization techniques to form useful elastomers. Polymers of propylene sulfide and/or butylene sulfide can be made by the present process which are useful elastomeric materials which may be formed into flexible films.

Details of the polymerization process are given in the specific examples set forth below. In general, the polymerization process is executed by bringing the monomeric episulfide or mixture of episulfides into contact with the catalysts described above, that is, by polymerizing the monomer charge in the presence of one or more of the catalysts. It is preferable, in order to obtain optimum results, that the starting monomeric materials be freshly distilled just prior to use from a reducing agent such as calcium hydride to remove oxidation products such as carbon dioxide and other impurities. The catalyst is used to the extent of about 0.05 to 10% by weight of the monomeric material(s) being polymerized. The preferred amount of catalyst is about 0.1 to 5% by weight. The polymerization can be carried out over a wide range of temperatures, the preferred temperature range being about room temperature (20–25° C.) to 80° C. Depending upon the reaction conditions and the nature of the monomeric material, the reaction may take about 1 to 72 hours or longer at the preferred temperatures.

The polymerization reaction may be conducted without using a solvent, as in a bulk process, or in water or methanol to form latex-type product suspensions, or any of various other inert organic solvents can be used in a solution polymerization process such as aromatic hydrocarbons, e.g., benzene, toluene, or xylene; aliphatic hydrocarbons, e.g., isopentane, n-hexane, or octane; or chlorinated hydrocarbons, e.g., carbon tetrachloride, methylene chloride, or ethylene chloride. The solvent is used to help regulate the rate of the reaction, where desired, by aiding in a dissipation of the heat of the reaction. The reaction mixture may be agitated to facilitate reaction. The pressure at which the reaction is carried out does not appear to be particularly critical, thus the reaction can be conducted in an open vessel at atmospheric pressure or in a closed vessel under autogenous pressure. In modifications of the process wherein a solvent is used, the reaction vessel is desirably charged with solvent, catalyst and monomer, although this particular order of addition is not critical to the successful practice of this invention.

In order to point out more fully the nature of the present invention, the following specific examples are given. These examples are merely illustrative of the present invention and are not intended as a limitation upon the scope thereof.

In many of the experiments, the product polymer contained physically bound solvent which was removed by evaporation, as in a vacuum oven at ambient or elevated temperatures. The polymer products obtained, where crystalline, are usually subjected to a determination of their melting range, and where elastomeric to a determination of their intrinsic viscosity.

Melting range determinations for the polymers in the examples were made with a Kofler Micro Hot Stage assembly (as sold by Arthur H. Thomas Co., Philadelphia, Pa.) and a microscope, using a 3° C./minute temperature rise rate. The ranges stated are those temperatures at which melting starts to those temperatures at which melting is complete.

Intrinsic viscosity determinations for the polymers in the examples were made using Ubbelhode viscometers and chloroform as the solvent at 30° C.

The various polymerization and product recovery procedures which were employed are designated hereinafter as Polymerization Procedures I to VI and differed from one another in such details as order of addition of the charge components; temperature and time for polymerization and for drying; polymerization under nitrogen gas or air at atmospheric or autogenous pressures, with or without agitation, in bulk or in solution, etc. A description of these procedures follows: the quantities, periods of time and product properties are given in the tables.

*Polymerization procedures*

I. Stainless steel polymerization bombs, previously filled with nitrogen gas, were charged with solvent, monomers and catalyst. The bombs were sealed and tumbled end-over-end in a constant temperature bath for a specific time interval. The bombs were then cooled to ambient temperature, opened, and the product contents were discharged into glass trays. The solid polymer products thus obtained were dried in a constant temperature vacuum oven for a specific interval of time prior to weighing and evaluation of their melting range.

II. Catalyst, solvent (where used) and monomer were charged to a glass polymerization vessel. The vessel was then filled with nitrogen gas, sealed and tumbled end-over-end at a constant elevated temperature for a period of time. The polymerization products were isolated and dried as described in I above, then evaluated for intrinsic viscosity.

III. Polymerization and isolation of a crystalline polymer product was carried out as described in I above, with an additional step, that of washing the crude pot product with benzene, which was performed prior to drying.

IV. A glass vessel, open to the air, was charged with catalyst and monomer, and then covered with metal foil to exclude dust. The reactants were stirred for 16–18 hours at ambient temperatures, and then were permitted to stand unstirred for an additional period of time. The rubbery polymeric products obtained were isolated, dried and evaluated for intrinsic viscosity.

V. Catalyst, monomer and solvent were charged to a glass polymerization vessel. The polymerization and isolation of a rubbery polymer product was carried out thereafter as described in III above.

VI. Monomers and catalyst were charged to a glass reaction vessel. The vessel was sealed and tumbled end-over-end for 20 hours at a temperature of about 26° C. At the end of this period the vessel was opened, and 100 ml. of methanol was added. The pot contents were shaken and permitted to stand for about 18 hours at ambient temperatures. The liquid portion was then decanted, and the solid polymer product was washed with three 100 ml. portions of methanol. Drying and characterization of the rubbery product was carried out as described in III above.

| | Example | | | | | |
|---|---|---|---|---|---|---|
| | 1 | 2 | 3 | 4 | 5 | 6 |
| Polymerization Charge Recipe Monomer, in g.: | | | | | | |
| Ethylene sulfide | 200.8 | 200.8 | | 200.0 | 190.8 | 160.6 |
| Propylene sulfide | | | 47.3 | | 12.7 | 50.6 |
| Solvent, in ml.: Benzene | 200 | 200 | | 212 | 200 | 200 |
| Catalyst, in g.: Zinc carbonate | 1.0 | 15.0 | 0.473 | 6.27 | 4.0 | 4.0 |
| Polymerization Conditions: | | | | | | |
| Polymerization Procedure | I | I | II | II | I | I |
| Time, in hours | 20 | 4 | 19 | 4 | 4 | 4 |
| Temperature, in °C | 80 | 80 | 61 | 80 | 80 | 80 |
| Product Isolation Drying Conditions: | | | | | | |
| Time, in hours | 50 | 24 | 18 | 18 | 24 | 24 |
| Temperature, in °C | 50 | 50 | 23 | 23 | 50 | 50 |
| Pressure, in mm. Hg | 5 | 5 | 5 | 5 | 5 | 5 |
| Product properties: | | | | | | |
| Type of product [1] | C | C | R | R | C | C |
| Yield, in g | 176.6 | 194.5 | (²) | 156 | 186.3 | 166.1 |
| Melting range, in °C | 209–214 | 208–212 | | | 204–208 | 195–199 |
| Intrinsic viscosity | | | 1.37 | 1.70 | | |

[1] C indicates a crystalline product; R indicates a rubbery or elastomeric product. ² Indicates the value in question was not measured.

| | Example | | | | |
|---|---|---|---|---|---|
| | 7 | 8 | 9 | 10 | 11 |
| Polymerization Charge Recipe Monomer, in g.: | | | | | |
| Ethylene sulfide | 25.1 | 200.8 | | | |
| Propylene sulfide | | | 47.3 | 18.89 | 9.45 |
| Allylthioglycidyl ether | | | | 8.31 | 24.81 |
| Solvent, in ml.: Benzene | 100 | 200 | | | |
| Catalyst, in g.: Zinc oxide | 1.0 | 10.0 | 0.473 | 0.259 | 0.259 |
| Polymerization Conditions: | | | | | |
| Polymerization Procedure | III | I | IV | VI | VI |
| Time, in hours | 74 | 4 | 167 | 20 | 20 |
| Temperature, in °C | 80 | 80 | 23 | 26 | 26 |
| Product Isolation Drying Conditions: | | | | | |
| Time, in hours | 24 | 24 | 22 | 16 | 16 |
| Temperature, in °C | 50 | 50 | 23 | 23 | 23 |
| Pressure, in mm. Hg | 5 | 5 | 5 | 5 | 5 |
| Product Properties: | | | | | |
| Type of product [1] | C | C | R | R | R |
| Yield in g | 22.5 | 176.2 | 21.3 | 4.39 | 1.15 |
| Melting range, in °C | 202–212 | 208–212 | | | |
| Intrinsic viscosity | | | 5.70 | (²) | (²) |

[1] C indicates a crystalline product; R indicates a rubbery or elastomeric product.
² Indicates the value in question was not measured.

|  | Example | | | |
|---|---|---|---|---|
|  | 12 | 13 | 14 | 15 |
| Polymerization Charge Recipe Monomer, in g.: | | | | |
| Ethylene sulfide | 25.1 | 25.1 | | |
| Propylene sulfide | | | 47.3 | 200 |
| Solvent, in ml.: Benzene | 100 | 100 | | 212 |
| Catalyst, in g.: | | | | |
| Zinc peroxide | 1.20 | | | |
| Zinc sulfide | | 2.40 | | |
| Zinc chromite | | | 0.473 | |
| Zinc oxalate | | | | 4.725 |
| Polymerization Conditions: | | | | |
| Polymerization Procedure | III | III | IV | V |
| Time, in hours | 72 | 2 | ⁴ 24 days | 45.5 |
| Temperature, in °C | 80 | 80 | 23-25 | 80 |
| Product Isolation Drying Conditions: | | | | |
| Time, in hours | 24 | 24 | (³) | (²) |
| Temperature, in °C | 50 | 50 | (³) | 23 |
| Pressure, in mm. Hg | 5 | 5 | (³) | 5 |
| Product Properties: | | | | |
| Type of product (¹) | C | C | R | R |
| Yield, in g | 23.5 | 25.1 | 32 | 187 |
| Melting range, in °C | 206-211 | 202-207 | | |
| Intrinsic viscosity | | | 2.1 | 0.758 |

¹ C indicates a crystalline product; R indicates a rubbery or elastomeric product.
² Indicates the value in question was not measured.
³ No drying step used.
⁴ Example 14—the full 24 day period was not required for the polymerization—the experiment was inadvertently allowed to go this long before the results were checked.

*Example 16*

Two, sealable, 30 ounce polymerization bottles were cleaned, dried and charged as follows:

|  | Bottle No. | |
|---|---|---|
|  | 1 | 2 |
| Zn(OH)₂ (grams) | 0.4 | 0.4 |
| Distilled H₂O (ml.) | 150 | 150 |
| 1,2 butylene sulfide (grams) | 88 | 79.2 |
| Thioglycidyl acrylate (grams) | | 14.4 |

The bottles were then sealed and placed in a 65° (±3) C. water bath for about 17 hours. The bottles were then removed from the bath cooled to room temperature, opened and the water decanted from each bottle. The contents of each bottle were then separately washed with about 200 ml. of methanol, dissolved in about 200–300 ml. of benzene and the polymer products were reprecipitated in about 2200 ml. of methanol. The polymer products of each bottle were then washed three to four times with about 200 ml. of methanol each time. The polymer products were then dried for about 20 hours under vacuum at about 50° C. Yields of 82.9 grams (94.2% of theory) of the butylene sulfide homopolymer and 68 grams (72.5% of theory) of the butylene sulfide/thioglycidyl acrylate copolymer were thereby obtained.

10 grams of each of the elastomeric polymer products were then placed, separately, in two glass jars. The polymers were dissolved in chloroform, the copolymer requiring some heating to effect its dissolution. Ten drops of 2,5 dimethyl-2,5 di(t-butylperoxy)hexane were then added to and admixed with each of the solutions. The two solutions were then placed in a vacuum oven under vacuum for about 3 hours at about 50° C. to remove the chloroform. The samples were then placed in an oven at 112 to 135° C. for about 80 hours. At the end of this time the homopolymer was soluble in hot chloroform whereas the copolymer had cured to a hard elastomer which retained 87% of its weight when extracted with hot chloroform for about 46 hours in a Soxhlet extraction tube.

*Example 17*

Three sealable 30 ounce polymerization bottles were cleaned, dried and charged as follows:

|  | Bottle No. | | |
|---|---|---|---|
|  | 1 | 2 | 3 |
| Propylene sulfide (ml.) | 50 | 50 | 50 |
| Benzene (ml.) | 90 | 85 | |
| Distilled H₂O (ml.) | | 5 | 90 |
| Zn(OH)₂ (grams) | 0.2 | 0.2 | 0.2 |

The bottles were then sealed and placed in a 65° C. water bath for about 16.5 hours. The bottles and contents were cooled to room temperature, opened and the contents of each was separately placed in 800 ml. of methanol to precipitate the polymer product. Each of the polymer products were then washed three times with 800 ml. of methanol and then dried to constant weight. The results are as follows:

|  | Bottle No. | | |
|---|---|---|---|
|  | 1 | 2 | 3 |
| Yield (grams) | 25.0 | 2.8 | 28.0 |
| Percent yield | 51.5 | 5.7 | 56.8 |

Appearance of polymer product—solid, tack- (soft, tacky elastomer) free elastomer.

*Example 18*

A sealable, 30 ounce polymerization bottle was cleaned, dried, flushed with nitrogen and then charged with 0.2 grams of mercuric oxide, 90 ml. of benzene and 50 ml. of propylene sulfide.

The mercuric oxide was a reagent grade material which had been predried by being heated to red heat for about an hour and stored, prior to use, under dry nitrogen. The benzene was dry and the propylene sulfide was freshly distilled.

The bottle was then sealed and tumbled for about 22 hours in an 80° C. water bath. The bottle was then removed from the bath, cooled to room temperature, opened and the viscous liquid reaction mixture was removed. The reaction mixture was evaporated to dryness in a vacuum oven at 5 mm. Hg at 40° C. to remove solvent and unreacted monomer. The rubbery residue was taken up again in about 200 ml. of dry benzene, allowed to stand overnight in the benzene and the resulting clear, supernatant liquid was filtered through #1 Whatman paper into two liters of methanol. The precipitated polymer was then washed with fresh methanol and dried under vacuum at 40° C. for 48 hours to constant weight. A yield of 46% was obtained. When tested for intrinsic viscosity ($\eta$) at 30° C. in chloroform, the polymer showed an intrinsic viscosity value of 0.569.

We claim:

1. A process comprising polymerizing at least one vicinal episulfide monomer under substantially non-alkaline conditions in the presence of, as a catalyst, at least one inorganic compound selected from the group consisting of the sulfides, chromites, oxides, peroxides, and hydroxides of zinc and mercury.

2. A process as in claim 1 wherein the polymerization is conducted in bulk.

3. A process as in claim 1 wherein the polymerization is conducted in an inert organic solvent.

4. A process as in claim 1 in which said catalyst is a compound of zinc.

5. A process as in claim 1 in which said catalyst is a compound of mercury.

6. A process as in claim 1 in which said catalyst is an oxide.

7. A process as in claim 1 in which said catalyst is a peroxide.

8. A process as in claim 1 in which said catalyst is an hydroxide.

9. A process as in claim 1 in which said catalyst is a sulfide.

10. A process as in claim 1 in which said episulfide monomer is selected from the group consisting of alkylene sulfides, styrene sulfide, allylthioglycidyl ether, thioglycidyl acrylate, thioglycidyl methacrylate, 3,4-epoxy-1,2-butylene sulfide, vinyl cyclohexene episulfide and butadiene monoepisulfide.

11. A process as in claim 10 in which at least one of said episulfide monomers is an alkylene sulfide.

12. A process as in claim 11 in which at least one of said episulfide monomers is ethylene sulfide.

13. A process as in claim 11 in which at least one of said episulfide monomers is propylene sulfide.

14. A process as in claim 1 in which allylthioglycidyl ether is interpolymerized with at least one vicinal episulfide monomer selected from the group consisting of styrene sulfide and the alkylene sulfides.

15. A process as in claim 14 in which allylthioglycidyl ether is interpolymerized with propylene sulfide.

16. A process as in claim 1 in which said catalyst is utilized at a concentration about 0.05 to 10% by weight of said monomer.

17. A process as in claim 1 in which the polymerization is conducted at about 20 to 80° C.

18. A process as in claim 1 in which said catalyst is zinc oxide.

19. A process as in claim 1 in which said catalyst is zinc peroxide.

20. A process as in claim 1 in which said catalyst is zinc sulfide.

21. A process as in claim 1 in which said catalyst is zinc chromite.

22. A process as in claim 1 in which said catalyst is zinc oxalate.

23. A process as in claim 1 in which said catalyst is zinc hydroxide.

24. A process as in claim 1 in which said catalyst is mercuric oxide.

25. A process as in claim 1 in which a compound selected from the group consisting of thioglycidyl methacrylate and thioglycidyl acrylate is interpolymerized with at least one vicinal episulfide monomer selected from the group consisting of styrene sulfide and the alkylene sulfides.

26. A process as in claim 25 in which thioglycidyl acrylate is interpolymerized with butylene sulfide.

References Cited

UNITED STATES PATENTS

| | | | |
|---|---|---|---|
| 1,976,678 | 10/1939 | Wittwer | 260—2 |
| 2,183,860 | 12/1939 | Coltof | 260—79 |
| 2,934,505 | 4/1960 | Gurgiole | 260—2 |
| 3,222,326 | 12/1965 | Brodoway | 260—79.7 |

FOREIGN PATENTS 480,077  1/1952  Canada.

OTHER REFERENCES

Miles et al. "Dithiols Part XII The Alkaline Hydrolysis of Acetylated Hydroxy-thiols A New Reaction for the Formation of Acylic Sulphides," J. Chem. Soc. (1952) pages 817–826 (p. 817 especially relied upon) 260–237 Ohta et al. "Studies on Ethylene Sulfide I. Polymerization of Ethylene Sulfide" as reported in Chem. Abs., vol. 51, 1957, p. 14668.

JOSEPH L. SCHOFER, *Primary Examiner.*

J. R. LIBERMAN, *Examiner.*

D. K. DENENBERG, R. A. BURROUGHS, J. F. McNALLY, *Assistant Examiners.*